Figure 5:
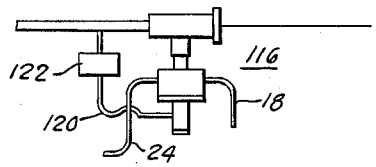

June 7, 1960 F. M. McDOUGALL 2,939,473
VALVE FOR REFRIGERATION EQUIPMENT
Filed Aug. 13, 1956 2 Sheets-Sheet 1
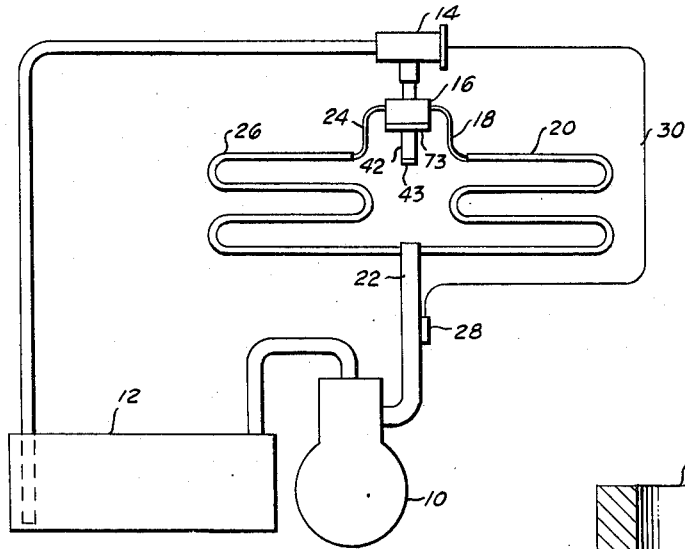
Fig. 1
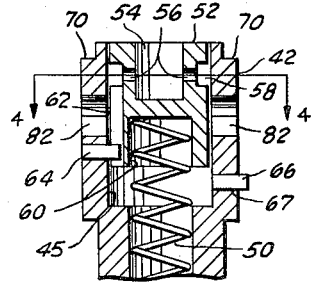
Fig. 3
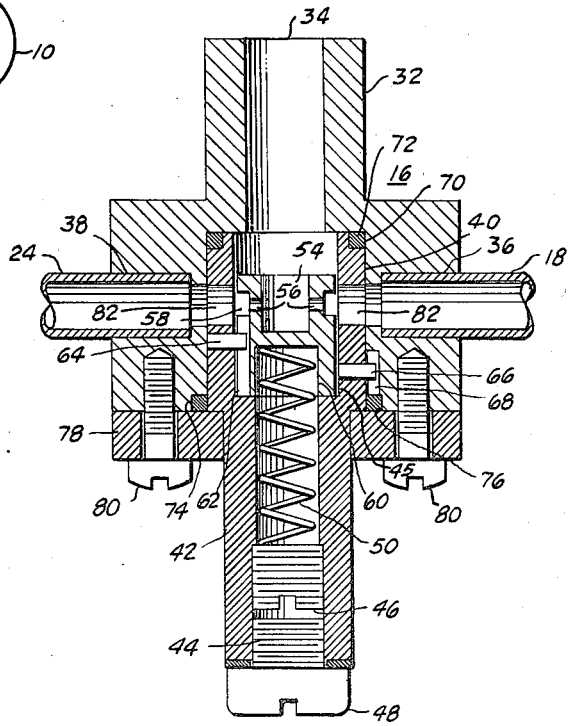
Fig. 2
Fig. 4
INVENTOR
Franklin M. McDougall
Rey Eilers
ATTORNEY INVENTOR
Franklin M. McDougall

*Ray Eilers*
ATTORNEY

United States Patent Office 2,939,473
Patented June 7, 1960

2,939,473

VALVE FOR REFRIGERATION EQUIPMENT

Franklin M. McDougall, 525 N. Crescent Drive, Kirkwood, Mo.

Filed Aug. 13, 1956, Ser. No. 603,530

3 Claims. (Cl. 137—115)

This invention relates to improvements in refrigeration equipment. More particularly, this invention relates to improvements in refrigeration equipment which must operate efficiently under variable loads.

It is therefore an object of the present invention to provide improved refrigeration equipment that can operate efficiently under variable loads.

In the operation of refrigeration equipment, and particularly in the operation of refrigeration equipment used in the air-conditioning field, the loads under which the refrigeration equipment must operate can vary widely. For example, during the heat of the daytimes in summer the load on the refrigeration equipment can be quite great, while that load can be materially smaller during the cool hours of the nights and during other periods when the external temperatures are moderate. The refrigeration equipment should be made large enough to have the cooling capacity needed to take care of the large daytime loads; but where that is done, that refrigeration equipment has an excess of cooling capacity during the nights and during other periods when the external temperatures are moderate. That excess of cooling capacity keeps the refrigeration equipment from operating efficiently during the nights and during the said other periods.

In recognition of this fact, refrigeration equipment has been proposed that could vary its cooling capacity; that cooling capacity being greatest when the external temperatures were high, and being smallest when those temperatures were moderate or low. That refrigeration equipment usually included a two-section expansion coil and a solenoid valve that could selectively shut off the flow of refrigerant to one of the sections of that coil. The solenoid valve was intended to be open during those periods when the external temperatures were high, thereby making the full capacity of the refrigeration equipment available during such periods; but that valve was intended to be closed whenever those temperatures became moderate, thereby reducing the capacity available during those periods. The resulting variations in capacity were intended to make the refrigeration equipment more efficient under a wider range of loads. The solenoid valve of such refrigeration equipment was usually controlled by a thermostat or a humidistat. Refrigeration equipment of this type can operate more efficiently over a wider range of loads than can refrigeration equipment with fixed cooling capacity, but the use of such refrigeration equipment entails the initial cost, the installation costs, and the maintenance costs of the solenoid valve, the thermostat or humidistat, and the wiring therefor. Further, the use of such refrigeration equipment entails the acceptance of the noise that inevitably accompanies the use of a solenoid valve. In addition, the distribution of the refrigerant to the expansion coil in that type of refrigeration system becomes quite complex where that coil has more than two sections.

The present invention provides refrigeration equipment that can vary its cooling capacity to insure high efficiency over wide ranges of load, and that does so without any need of a solenoid valve, a thermostat or humidistat, and the wiring therefor. Such refrigeration equipment is less expensive to manufacture, less expensive to install and less expensive to maintain than is variable capacity refrigeration equipment utilizing a solenoid valve and controls and wiring therefor. Further, the refrigeration equipment provided by the present invention is quieter and more certain in operation. In addition, that refrigeration equipment can easily have more than two evaporators. It is therefore an object of the present invention to provide refrigeration equipment that varies its cooling capacity to insure high efficiency over wide ranges of load, and that does so without any need of a solenoid valve, its controls and its wiring.

The refrigeration equipment provided by the present invention is enabled to vary its cooling capacity because it has two or more evaporators and has a distributor that directs refrigerant to all of those evaporators when full cooling capacity is needed and that shuts off the flow of refrigerant to one or more of those evaporators when less than full cooling capacity is needed, and because that distributor can operate automatically without any need of electrical control equipment. That distributor has a number of ports that are connected to the various evaporators, and it has a movable element that selectively covers and uncovers one or more of those ports. A spring biases the movable element in one direction, and changes in the pressure on, or rate of flow of, the refrigerant can move the movable element in the opposite direction. By being responsive to the pressure on, or the rate of flow of, the refrigerant, the movable element in the distributor provided by the present invention can assure a direct and true response to the condition to be controlled. Hence, changes in the cooling capacity of the refrigeration equipment provided by the present invention can be made to respond directly and truly to changes in the condition being controlled.

The distributor provided by the present invention can be made to respond to the pressure of the expanding refrigerant in the refrigeration equipment. In doing so, that distributor is enabled to change the cooling capacity of the refrigeration equipment promptly and directly; thereby avoiding the delay which could arise if the changes in cooling capacity were controlled by a thermostat or humidistat. The thermal lag in a large body of air, or the moisture lag in such a body of air, could unduly delay the change in cooling capacity of the refrigeration equipment. Any such delay is avoided by use of the present invention. It is therefore an object of the present invention to provide a distributor for refrigeration equipment which responds directly to the pressure of the expanding refrigerant within that equipment to change the cooling capacity of that equipment.

The distributor provided by the present invention increases or decreases the available cooling capacity by permitting or preventing the flow of refrigerant to one or more evaporators of the refrigeration equipment. The distributor will act automatically and promptly and will thereby enable that cooling capacity to approximate the cooling needs of the load even though that load is variable. In this way, the present invention attains high efficiency of operation.

The present invention is particularly useful in the field of air-conditioning because it keeps one or more of the evaporators cold despite variations in the load on the refrigeration equipment, and a continuously cold evaporator assures continuous de-humidification of the air being conditioned. In particular, the present invention provides a plurality of evaporators and provides a distributor which shuts off the flow of refrigerant to one or more of those evaporators during periods when the external temperatures are moderate or low. In doing so, the present invention reduces the effective cooling capacity of the refrigeration equipment, and thereby enables the refrigeration equipment to operate with fewer and shorter inactive periods. This keeps at least one evaporator cold continuously, and that evaporator will de-humidify the air continuously. It is therefore an object of the present invention to provide refrigeration equipment with a plurality of evaporators and with a distributor that shuts off one or more of those evaporators whenever the load falls off, and that therefore keeps at least one evaporator cold continuously.

The distributor provided by the present invention can, if desired, be made so it will reduce the cooling capacity of the refrigeration equipment if the volume of flow of expanding refrigerant becomes excessive. This is desirable because it enables the distributor to protect the refrigeration equipment against injury due to overloads. For example, if the cooling system for the condenser failed or if the expansion valve failed in the open position an excessive flow of expanding refrigerant would result, and that excessive flow could be hurtful. The distributor provided by the present invention checks that excessive flow by shutting off the flow to one or more of the evaporators, and thereby prevents injury to the refrigeration equipment.

The distributor provided by the present invention can also, if desired, be made responsive to the condensing pressures within the refrigeration equipment. This can be done by extending a small tube from a point in the high pressure side of the refrigeration equipment to the housing of the distributor, and by having a valve in that tube which responds to increases in the condensing pressure to place the distributor in communication with that pressure. Once the distributor is placed in communication with the excessive condensing pressure, it can shut off the flow of refrigerant to one or more of the evaporators and thereby starve the compressor until the condensing pressure returns to safe levels.

Other and further objects and advantages of the present invention should become apparent from an examination of the drawing and accompanying description.

In the drawing and accompanying description, several preferred embodiments of the present invention are shown and described, but it is to be understood that the drawing and accompanying description are for the purpose of illustration only and do not limit the invention and that the invention will be defined by the appended claims.

Figure 6:
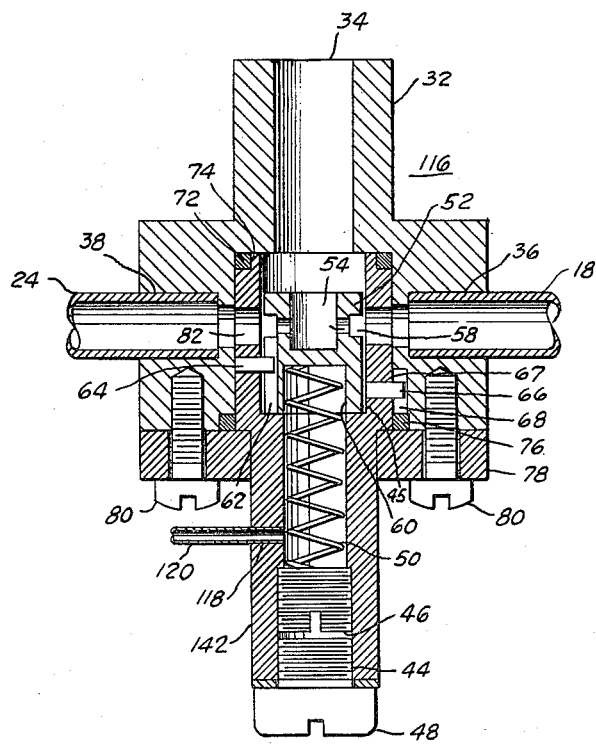
Figure 7:
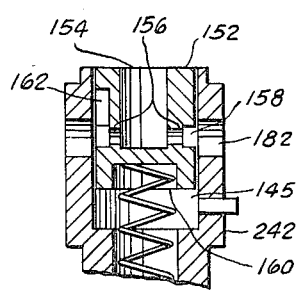

In the drawing,

Fig. 1 is a schematic diagram of one form of refrigeration equipment that is made in accordance with the principles and teachings of the present invention, Fig. 2 is a cross sectional view of one form of distributor, for refrigeration equipment, that is made in accordance with the principles and teachings of the present invention, Fig. 3 is a sectional view of the upper part of the spring housing and of the movable element of the distributor of Fig. 2, and it shows that movable element in its upper position, Fig. 4 is a sectional view in plan, and it is taken along the plane indicated by the line 4—4 in Fig. 3, Fig. 5 is a view of a portion of a modified form of refrigeration equipment that is made in accordance with the principles and teachings of the present invention, Fig. 6 is a sectional view of the distributor used in the modified form of refrigeration equipment shown in Fig. 5, and Fig. 7 is a sectional view of the upper part of still another modified form of distributor that is made in accordance with the principles and teachings of the present invention.

Referring to the drawing in detail, the numeral 10 denotes a reciprocating-piston compressor of the type used in many compression-expansion refrigeration systems. Compressed refrigerant will flow from the outlet of compressor 10 to the inlet of a condenser 12, shown in the drawing as being a combination condenser and liquid receiver. High pressure refrigerant in liquid form will pass from the outlet of the condenser 12 and will flow to the expansion element 14. In the particular modification shown, that expansion element is an expansion valve; but it can be a capillary tube or any of the other customarily used expansion elements used in conventional refrigeration systems. The outlet of the expansion element 14 is connected to the inlet of a distributor which is denoted generally by the numeral 16. A supply line 18 extends from the discharge port 36 of the distributor 16 to an evaporator 20, and a second supply line 24 extends from the discharge port 38 of the distributor 16 to an evaporator 26. In the drawing, the evaporators 20 and 26 are shown as being separate; but in actual practice those evaporators will usually be mounted in the same group of fins in the same coil structure. Furthermore, while just two evaporators 20 and 26 are shown, the present invention is not restricted to the distributing of refrigerant to just two evaporators, instead that distributor can supply refrigerant to more than two evaporators.

Each of the evaporators 20 and 26 has its outlet connected to the suction line 22 of the compressor 10. A remote bulb 28 of usual design and construction is mounted in heat-exchanging relation with the suction line 22 of the compressor; and that remote bulb is suitably connected to the expansion element 14 by a tube 30. The remote bulb 28 will respond to superheat in the refrigerant entering the suction line 22 to cause the expansion element 14 to open. That remote bulb will respond to decreases in temperature of the suction line 22, indicating an absence of superheat, to cause the expansion valve 14 to close.

As indicated particularly in Figs. 2–4, the distributor 16 includes a housing or body 32 which may be cast or machined. That housing or body has a bore 34 in the upper end thereof to receive the line which extends downwardly from the outlet of the expansion element 14. The housing 32 also has a larger diameter bore 40 that is concentric with and contiguous to the bore 34. The bores 34 and 40 coact with the line extending between the housing 32 and the expansion element 14 to place the discharge ports 36 and 38 in communication with the outlet of that expansion element. The inlet end of the supply line 18 actually telescopes within the port 36, and the inlet end of the supply line 24 actually telescopes within the port 38. Those supply lines will be suitably secured in liquid-tight relation with the housing 32 by solder or the like. The outlet ends of the supply lines 18 and 24 will be suitably connected in liquid-tight relation with the evaporators 20 and 26 by solder or the like. If more than two evaporators are desired, additional discharge ports and additional supply lines will be provided.

The bore 40 in the body or housing 32 receives a spring housing 42. That spring housing has an axial bore which is in register with, and is in alignment with, the bore 34 of the housing 32. Internal threads 44 are provided adjacent the lower end of the axial bore in the spring housing 42; and those threads receive a set screw 46 and a closure screw 48. The closure screw 48 can be removed to permit the adjustment of the position of the set screw 46 by a screwdriver or the like. The upper face of the set screw 46 receives the lower end of a helical compression spring 50, and the adjustment of the position of the set screw 46 relative to the internal threads 44 determines the initial compression of the spring 50.

The numeral 52 denotes a cylindrical valve element that is disposed for reciprocating movement within a bore 45 in the upper end of the spring housing 42. The bores 45 and 34 are concentric and contiguous, and they are also concentric and contiguous with the axial bore in the lower end of the spring housing 42. Actually, the bore 45 constitutes, in effect, a larger diameter portion of that bore.

The movable valve element 52 fits snugly within the larger diameter bore 45, and it can reciprocate axially of that bore in the manner of a piston within a cylinder. A recess 54 is provided in the upper end of the valve element 52, and radial ports 56 extend outwardly from that recess 54 through the wall of the valve element 52 which defines that recess. Only two ports 56 are shown in the drawing because only two evaporators are shown. However, if one or more additional evaporators were used, one or more additional ports 56 would be provided.

An annular passage 58 is provided at the exterior of the valve element 52, and that annular passage is contiguous with the radial ports 56. This enables refrigerant, entering the recess 54 in the upper end of the valve element 52, to move radially outwardly through the right hand port 56, and then move circumferentially through the annular passage 58 to the vicinity of the left hand port 56. A recess 60 is provided in the lower end of the valve element 52, and that recess accommodates the upper end of the helical compression spring 50. That spring biases the valve element 52 upwardly toward the upper end of the large diameter bore 45. The bore 34 has an internal diameter which is smaller than the external diameter of the valve element 52, and hence the shoulder defined by the bores 34 and 40 limits the upward movement of the valve element 52.

An axially-directed slot 62 is formed in the exterior of the valve element 52, and that slot is contiguous with the bottom face of that element. That slot is also contiguous with the annular passage 58 of that valve element. The axially-directed slot 62 accommodates one end of a pin 64 that is seated in a radially-directed hole in the spring housing 42. The pin 64 coacts with the slot 62 in the valve element 52 to limit rotation of that valve element relative to the spring housing 42.

A pin 66 is mounted in a radially-directed hole 67 in the spring housing 42; and the outer end of that pin extends into an axially-directed slot 68 in the housing 32. The pin 66 and the slot 68 coact to prevent rotation of the spring housing 42 relative to the housing 32.

The numeral 70 denotes a shoulder formed at the upper end of the spring housing 42, and that shoulder receives an O-ring 72. The O-ring 72 has a diameter greater than the vertical dimension of the shoulder 70, and therefore that O-ring will be compressed into sealing engagement with that shoulder and with the upper end of the bore 40 of the housing 32. A shoulder 74 is provided in the housing 32 adjacent the lower end thereof, and that shoulder receives an O-ring 76. The diameter of the O-ring is greater than the vertical height of the shoulder 74, and hence that O-ring will provide a sealing engagement between the shoulder 74 and a retainer plate 78 which is held against the lower face of the housing 32 by fasteners 80, shown in the form of screws.

Ports 82 are provided in the spring housing 42, and those ports are held in circumferential registry with the ports 36 and 38 by the interaction of the pin 66 and the slot 68. The ports 56 are held in circumferential registry with the ports 82 by the interaction of the pin 64 and the slot 62. The retainer plate 78 has a central opening which is larger than the lower portion of the spring housing 42 but is smaller than the upper portion of that housing. Hence, that retainer plate holds the spring housing 42 tightly in position within the bore 40 of the housing 32; and thereby holds the ports 82, 36 and 38 in axial registry.

The spring 50 biases the valve element 52 to the upper position shown in Fig. 3. At such time the annular passage 58 is above the level of, and out of register with, the ports 82 in the spring housing 42. However, the axial slot 62 is in register with the left hand port 82. Consequently, refrigerant from the expansion element 14 can enter the bore 34, enter the recess 54 in the upper end of the valve element 52, pass radially outwardly from the recess 54 through both radially directed ports 56, and into the annular passage 58. The refrigerant passing outwardly from the left hand port 56 will move vertically downward and pass through the slot 62 until it is in register with the left hand port 82, whereupon that refrigerant will pass through the supply line 24 and enter the evaporator 26. The refrigerant passing through the right hand port 56 will pass through the annular passage 58 until it reaches the axial slot 62, whereupon it will move vertically downward through the slot 62 to the left hand port 82, and thence through the supply line 24 to the evaporator 26. As long as the valve element 52 is in its upper position it makes certain that the distributor directs all of the refrigerant to the one evaporator 26. That evaporator will provide enough cooling capacity for those periods when the external temperatures are moderate or low. Yet, the capacity of the evaporator 26 will not be so large that the compressor 10 will experience long periods of inactivity. Instead, that compressor will run most of the time and will keep the evaporator 26 cold, thereby enabling that evaporator to de-humidify the air moved over it.

The valve element 52 will remain in the upper position shown in Fig. 3 as long as the expansion element 14 passes moderate or small volumes of refrigerant. However, when the external temperatures rise, the expansion element 14 will permit more refrigerant to enter the bore 34 of the distributor 16. The increased flow of refrigerant will increase the pressure at the upper side of the valve element 52, and that pressure can rise to the point where it will overcome the force exerted by the spring 50. Thereupon the valve element 52 will move downwardly to the position shown by Fig. 2. When the annular passage 58 moves into register with the ports 82, half of the refrigerant can pass outwardly through the righthand port 56, can pass radially through the annular passage 58, and can pass through the righthand port 82. The rest of the refrigerant will pass outwardly through the lefthand port 56, will pass radially through the passage 58, and will pass through the lefthand port 82. As long as the flow of refrigerant is great enough, the valve element 52 will remain in the position of Fig. 2, and while in that position, it will supply refrigerant to both evaporators 20 and 26. However, whenever the expansion element 14 reduces the overall flow of refrigerant, the pressure on the upper surface of the valve element 52 will decrease and the spring 50 will move the valve element 52 upwardly to the position of Fig. 3.

The response of the valve element 52 to the rate of flow of the refrigerant is direct and immediate. This is an improvement over the indirect response, of a thermostat or humidistat, which can be delayed or distorted because of the thermal lag or moisture lag of the thermostat or humidistat or of the space being air-conditioned. Further, the operation of the valve element 52 is not dependent upon a solenoid or other electrical actuator.

If an additional evaporator is desired, that evaporator will be connected to a port, similar to the ports 82, by a supply line similar to the supply lines 18 and 24. If that third evaporator is to be shut off when the valve element 52 is in its upper position, a slot 62 will not be provided adjacent the port connected to that evaporator. However, if that evaporator is to receive refrigerant when the valve element 52 is in its upper position, a slot 62 will be provided adjacent the port for that evaporator. Additional evaporators can be added to the refrigeration equipment in this way; those additional evaporators being suitably connected to receive, or not to receive, refrigerant when the valve element is in its upper position. The present invention thus provides considerable versatility for the refrigeration equipment.

Referring to Figs. 5 and 6, a distributor 116 is shown that is very similar to the distributor 16 of Figs. 1–4. The distributor 116 has the housing 32, the supply lines 18 and 24, the valve element 52, the O-rings 72 and 76 and the retainer plate 78 of Figs. 1–4. However, the distributor 116 has a spring housing 142 that is slightly different from the spring housing 42. The spring housing 142 has the internal threads 44, the set screw 46, the closure screw 48, the spring 50, the pin 64, the slot 67, the pin 66, the large diameter recess 45, and the shoulder 74 of the spring housing 42. In addition, the spring housing 142 has an opening 118 that communicates with the axial bore of that spring housing. A tube 120 has one end thereof connected to the opening 118 of the spring housing 142; and the other end of that tube is connected to the high pressure side of the refrigeration equipment. A valve 122 is provided intermediate the ends of the tube 120, and that valve normally isolates the spring housing 142 from the high pressure side of the refrigeration equipment. The valve 122 could be of many different constructions, but a simple pressure-relief valve is quite useful.

The distributor 116 will, under all normal conditions, operate in the same way the distributor 16 operates. However, if the condensing pressure rises above a predetermined value, the valve 122 will open and let high pressure refrigerant flow into the axial recess of the spring housing 142. That refrigerant will act upon the bottom surface of the movable element 52 and force that element into its uppermost position. The resulting shutting-off of evaporator 20 will reduce the suction pressure of the compressor; and eventually the condensing pressure of the refrigeration equipment will drop to an acceptable level. Thereafter, the valve 122 will close, and the distributor 116 will again operate independently of the condensing pressure.

Fig. 7 shows the movable element 152 and the upper part of the spring housing 242 of still another form of distributor provided by the present invention. That spring housing has a very deep recess 145 therein; and that movable element has a deep recess 154 in the upper end thereof, has radially directed ports 156 therein, has a circumferentially extending passage 158 therein, has a shallow recess 160 in the bottom thereof, and has an axially-directed slot 162. The principal difference between the distributor of Figs. 1–4 and the distributor utilizing the movable element 152 and the spring housing 242 is the fact that the ports 156 are normally in register with the ports 182, while the ports 56 are normally above the level of the ports 82. Further, the movable element 152 moves downwardly to shut off the evaporator 20 while the movable element 52 moves upwardly to do so. As a result, the distributor utilizing the movable element 152 and the spring housing 242 can respond to increases in the pressure on, or the rate of flow of, the expanding refrigerant to reduce the cooling capacity of the refrigeration equipment.

Whereas several preferred embodiments of the present invention have been shown and described, it should be apparent to those skilled in the art that various changes may be made in the form of the invention without affecting the scope thereof.

What I claim is:

1. A distributor that is usable in refrigeration equipment to receive refrigerant and selectively direct refrigerant to one or more of a plurality of evaporators and that comprises a housing, a recess in said housing, an inlet port in said housing that communicates with said recess and that is connectible to a source of refrigerant, an outlet port in said housing that continuously communicates with said recess and that is connectible to an evaporator, a second outlet port in said housing that communicates with said recess and that is connectible to a second evaporator, a movable element that is positioned in said recess and is movable to a predetermined position to close second outlet port and is movable out of said predetermined position to open said second outlet port, said movable element having a wall that defines a recess in one end thereof, said recess confronting said inlet port of said housing, said movable element having ports in the said wall thereof, said ports in said wall being in register with said outlet ports in said housing, and a passage in said movable element extending from one of said outlet ports in said wall to an axially spaced portion of said movable member, said movable member being movable to shift the said ports thereof out of register with said outlet ports in said housing and thereby place said axially spaced portion of said movable member in register with one of said outlet ports in said housing, whereby said passage can conduct refrigerant from said one outlet port in said wall to said axially spaced portion and thence to said one outlet port in said housing.

2. A distributor that is usable in refrigeration equipment to receive refrigerant and selectively direct refrigerant to one or more of a plurality of evaporators and that comprises a housing, a recess in said housing, an inlet port in said housing that communicates with said recess and that is connectible to a source of refrigerant, an outlet port in said housing that continuously communicates with said recess and that is connectible to an evaporator, a second outlet port in said housing that communicates with said recess and that is connectible to a second evaporator, a movable element that is positioned in said recess and is movable to a predetermined position to close second outlet port and is movable out of said predetermined position to open said second outlet port, said movable element having a wall that defines a recess in one end thereof, said recess confronting said inlet port of said housing, said movable element having ports in the said wall thereof, said ports in said wall being in register with said outlet ports in said housing, a passage in said movable element extending from one of said outlet ports in said wall to an axially spaced portion of said movable member, said movable member being movable to shift the said ports thereof out of register with said outlet ports in said housing and thereby place said axially spaced portion of said movable member in register with one of said outlet ports in said housing, whereby said passage can conduct refrigerant from said one outlet port in said wall to said axially spaced portion and thence to said one outlet port in said housing, and a second passage extending between and connecting said ports of said movable member whereby refrigerant discharging through both of said ports of said movable member can pass to the first said passage and thence to said axially spaced portion of said movable member.

3. A distributor that is usable in refrigeration equipment to receive refrigerant and selectively direct refrigerant to one or more of a plurality of evaporators and that comprises a housing, a recess in said housing, an inlet port in said housing that communicates with said recess and that is connectible to a source of refrigerant, an outlet port in said housing that continuously communicates with said recess and that is connectible to an evaporator, a second outlet port in said housing that communicates with said recess and that is connectible to a second evaporator, a movable element that is positioned in said recess and is movable to a predetermined position to close second outlet port and is movable out of said predetermined position to open said second outlet port, said movable element having a wall that defines a recess in one end thereof, said recess confronting said inlet port of said housing, said movable element having ports in the said wall thereof, said ports in said wall being in register with said outlet ports in said housing, a passage in said movable element extending from one of said outlet ports in said wall to an axially spaced portion of said movable member, said movable member being movable to shift the said ports thereof out of register with said outlet ports in said housing and thereby place said axially spaced portion of said movable member in register with one of said outlet ports in said housing, whereby said passage can conduct refrigerant from said one outlet port in said wall to said axially spaced portion and thence to said one outlet port in said housing, and a second passage in said movable member that interconnects said ports of said movable element, said second passage in said movable member extending circumferentially of said recess in said movable member.

References Cited in the file of this patent

UNITED STATES PATENTS

| | | |
|---|---|---|
| 2,133,949 | Buchanan | Oct. 23, 1938 |
| 2,198,328 | Brown et al. | Apr. 23, 1940 |
| 2,337,862 | Baer | Dec. 28, 1943 |
| 2,637,985 | Ray | May 12, 1953 |